United States Patent [19]

Koyama

[11] Patent Number: 4,569,586

[45] Date of Patent: Feb. 11, 1986

[54] PAPER SUPPLY SYSTEM OF COPYING MACHINE

[75] Inventor: Shigeo Koyama, Osaka, Japan

[73] Assignee: Mita Industrial Co., Ltd., Osaka, Japan

[21] Appl. No.: 589,934

[22] Filed: Mar. 14, 1984

[30] Foreign Application Priority Data

Apr. 12, 1983 [JP] Japan ................................ 58-65019

[51] Int. Cl.$^4$ .............................................. G03B 27/58

[52] U.S. Cl. .................................. 355/72; 355/3 SH; 355/14 SH

[58] Field of Search .................. 355/3 SH, 14 SH, 72; 271/3.1, 4, 9, 127

[56] References Cited

U.S. PATENT DOCUMENTS 4,110,030 8/1978 Knechtel .............................. 355/11

4,187,024 2/1980 Satomi et al. ..................... 355/14 R

*Primary Examiner*—Richard A. Wintercorn

*Attorney, Agent, or Firm*—Wenderoth, Lind & Ponack

[57] ABSTRACT

A copying machine paper supply system includes a space for housing paper supply cassettes and at least two paper supply rollers and cassette-holding members installed in such space. The paper supply rollers and cassette-holding members are arranged in a vertically staggered manner with a lower one arranged inwardly, in the direction of insertion of a paper supply cassette than an upper one, and with each cassette supported only at opposite sides thereof.

6 Claims, 10 Drawing Figures

PAPER SUPPLY SYSTEM OF COPYING MACHINE

BACKGROUND OF THE INVENTION

1. Field of the Invention

The present invention relates to a paper supply system for installing and detaching paper supply cassettes in and from a copying machine.

2. Description of the Prior Art

Although there are known a two-stage copying machine, in which two paper supply cassettes can be positioned at one time, a three-stage copying machine, in which three paper supply cassettes can be positioned at one time, a fourth-stage copying machine, in which four paper supply cassettes can be positioned at one time, and the like, in general there are only paper supply cassettes of small volume type housing about 250 pieces of copying paper and paper supply cassettes of large volume type housing about 500 pieces of copying paper. Copying paper sheets of B5 size and A4 size provided in JIS, which are used frequently, should be housed in a paper supply cassette of large capacity. On the contrary, copying paper sheets of B4 size and the like, which are large-sized and used at lower frequencies, should be housed in a paper supply cassette of smaller capacity, since such paper supply cassette otherwise would be relatively heavy, thereby resulting in the disadvantage of difficulty of handling and the possibility that the copying papers become deteriorated by moisture and the like. In addition, at present paper supply cassettes of small volume type housing about 250 pieces of copying paper and those of large volume type housing about 500 pieces of copying paper are used since copying papers are frequently packaged with 500 pieces as a unit. Although copying machines are known in which paper supply cassettes of small volume type are positioned in some multi-stage cassette receiving spaces and paper supply cassettes of large volume type are positioned in the remainder of such multi-stage spaces, only paper supply cassettes of small volume type can be positioned in spaces for housing paper supply cassettes of small volume type, and only paper supply cassettes of large volume type can be positioned in spaces for housing paper supply cassettes of large volume type, without interchange therebetween. As a result, such machines are disadvantageous for practical use. In such arrangement, a cassette-holding member extends across substantially the entire width of the space for housing the paper supply cassette, and the bottom surface of the cassette is supported over the entire width thereof.

SUMMARY OF THE INVENTION

It is an object of the present invention to eliminate the above and other disadvantages incidental to the conventional copying machine paper supply system.

It is another object of the present invention to provide a convenient copying machine paper supply system whereby not only paper supply cassettes of small volume type housing for example 250 pieces of copying paper can be positioned in a multi-stage manner, but also paper supply cassettes of large volume type housing for example 500 pieces of copying paper, or paper supply cassettes of super large volume type housing copying papers of more than 500 pieces, can be installed to replace paper supply cassettes of small volume type if necessary.

BRIEF DESCRIPTION OF THE DRAWINGS

The drawings show preferred embodiments of a copying machine of the present invention, in which.

DESCRIPTION OF THE PREFERRED EMBODIMENTS

Figure 1:
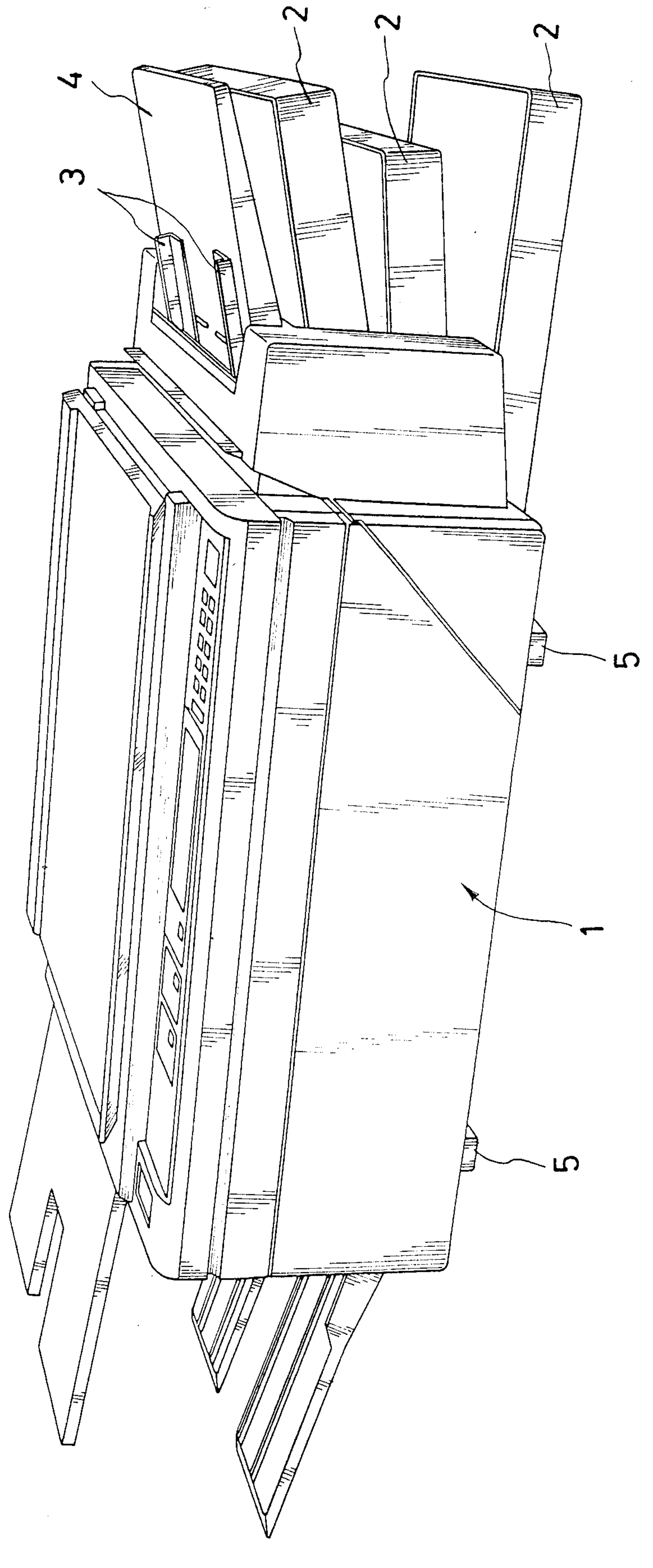
FIG. 1 is a perspective view showing the entire copying machine.
Figure 2:
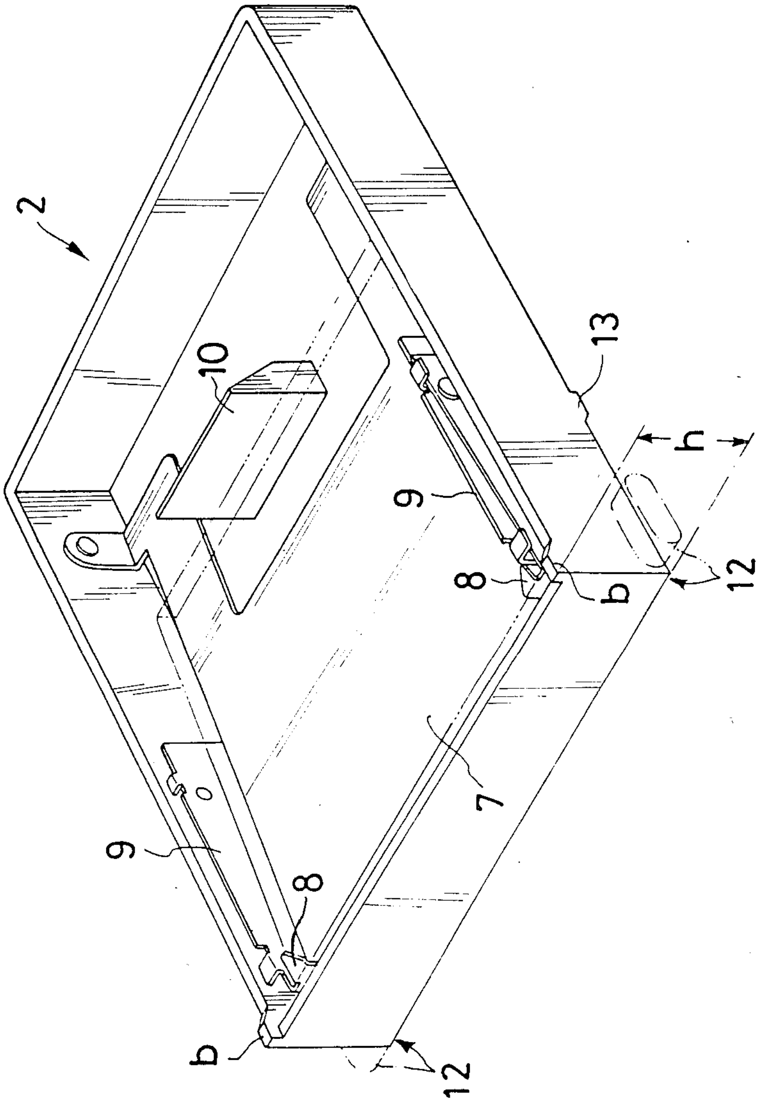
FIG. 2 is a perspective view showing a paper supply cassette of small volume type.
Figure 3:
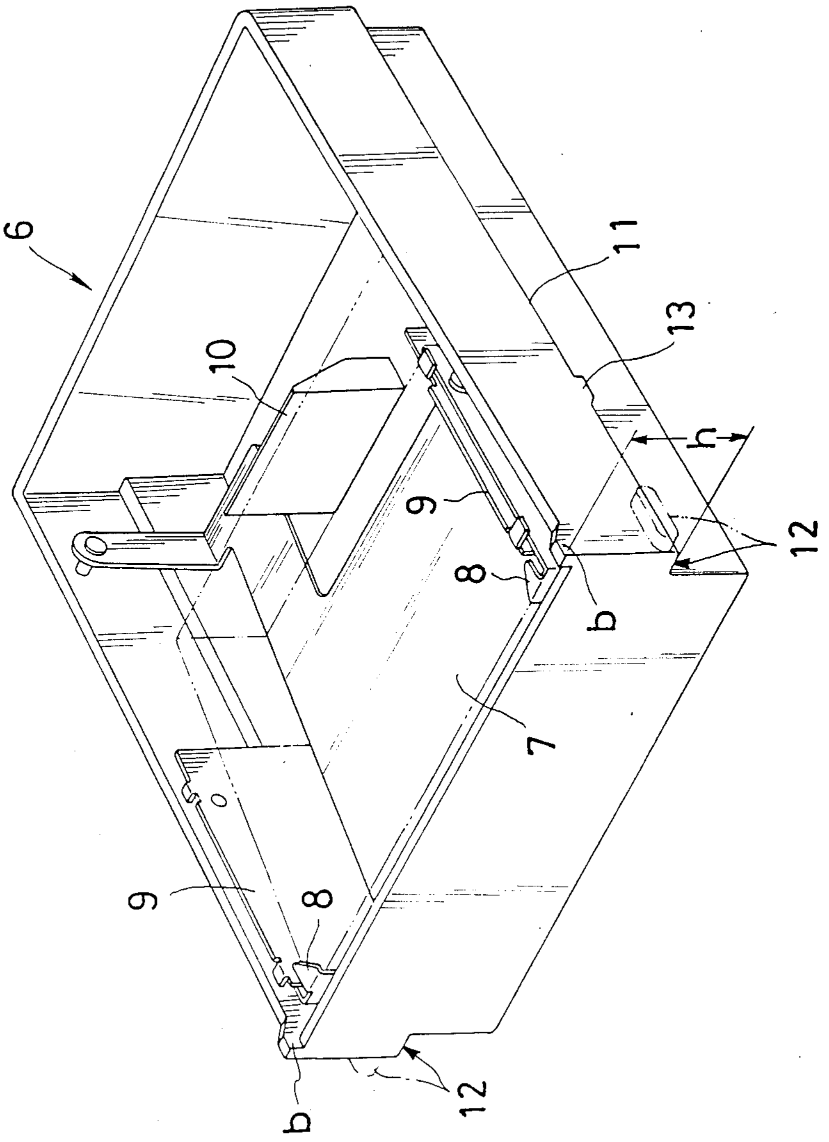
FIG. 3 is a perspective view showing a paper supply cassette of large volume type.

The preferred embodiments of the present invention will be described below with reference to the drawings. Referring now to FIG. 1, which is a perspective view showing an entire copying machine, three paper supply cassettes 2 of small volume type, each housing 250 pieces of copying paper therein, can be employed in a vertical three-stage manner. A manual copying paper-inserting plate 4 is provided with a pair of movable copying paper-controlling plates 3, movable in respective opposite left and right directions, and is arranged over the paper supply cassette 2 of small volume type of the uppermost stage. A housing 1 is provided with four leg portions 5 in a bottom portion thereof. The two leg portions 5 of the front side are fixed and the two leg portions 5 of the rear side are adjustable in height up and down. Referring then to FIG. 2, which is a perspective view showing a paper supply cassette 2 of small volume type housing 250 pieces of copying paper therein, and to FIG. 3, which is a perspective view showing a paper supply cassette 6 of large volume type housing 500 pieces of copying paper therein, each paper supply cassette 2, 6 is provided with a plate 7 for supporting copying papers thereon, a pushing-up mechanism (not shown) installed under plate 7 for moving copying papers thereon upwardly, clicks or cogs 8 for retaining sheets of copying paper, side guide plates 9 and a rear guide 10. These mechanisms are the same as in conventional cassettes. Rear guide 10 for abutting the rear portions of copying papers is constructed to be movable back and forth depending on the length of copying papers in the direction of transference or discharge thereof.

According to the present invention, large volume cassette 6 is different from conventional cassettes. Thus, supply cassette 6 of large volume type is provided at each side thereof with an inwardly extending step 11, located at the same height h from the cassette top as the total height of the paper supply cassette 2 of small volume type. The lower surface of step 11 forms a guide portion 12 for abutment with a cassette-guiding and holding member 17, to be described below with reference to FIGS. 4 and 5. Paper supply cassette 2 of small volume type has formed at the bottom thereof both left and right side guide portions 12 for abutment with cassette-guiding and holding member 17. Both paper supply cassettes 2, 6 are provided with stoppers 13 at predetermined positions at the lower surfaces of steps 11. In addition, both cassettes 2 and 6 are provided with left and right side projections b at the front ends of the upper portions thereof.

Figure 4:
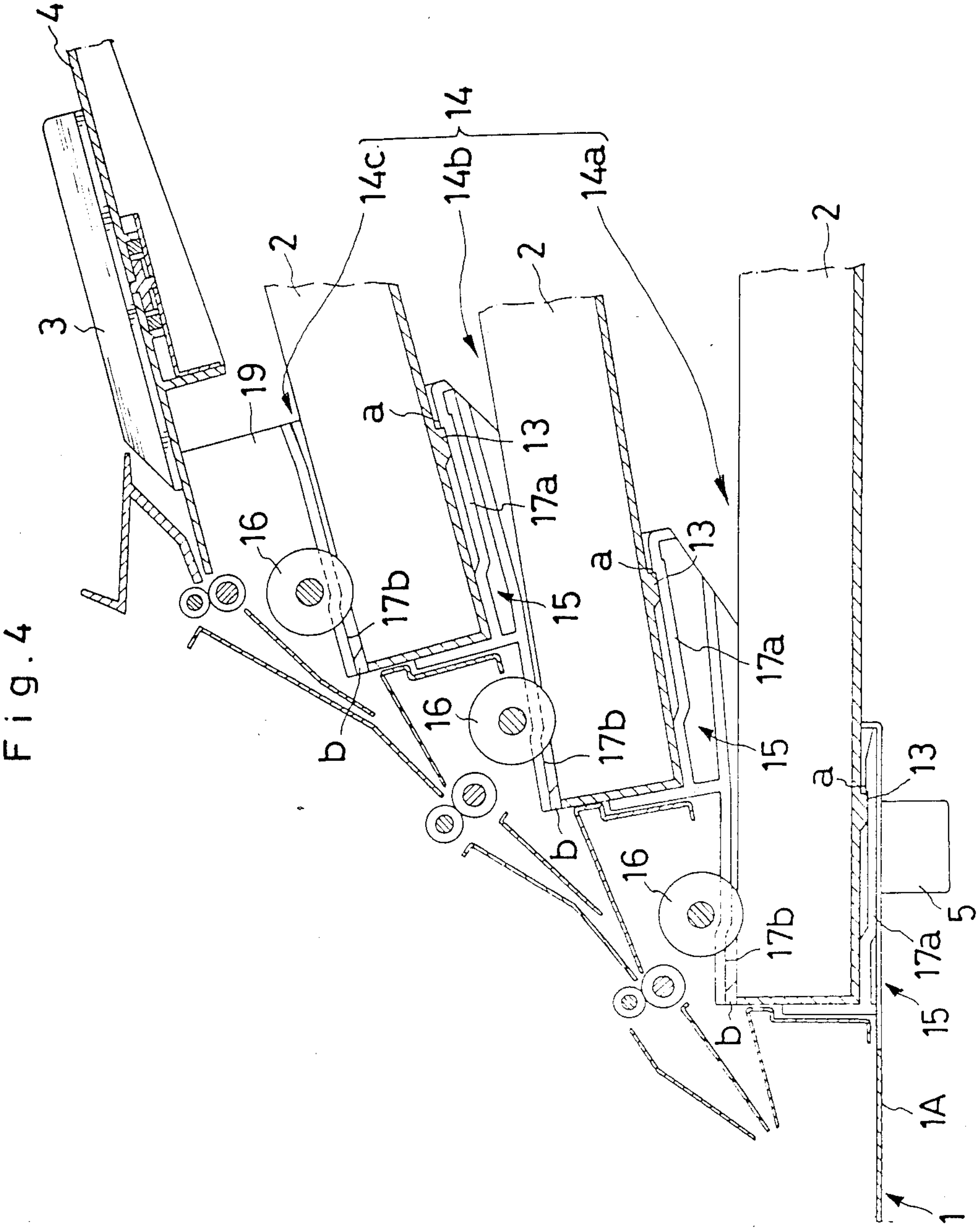
FIGS. 4 and 5 are longitudinally sectional front views showing details of the principal parts of a cassette-holding portion.
Figure 5:
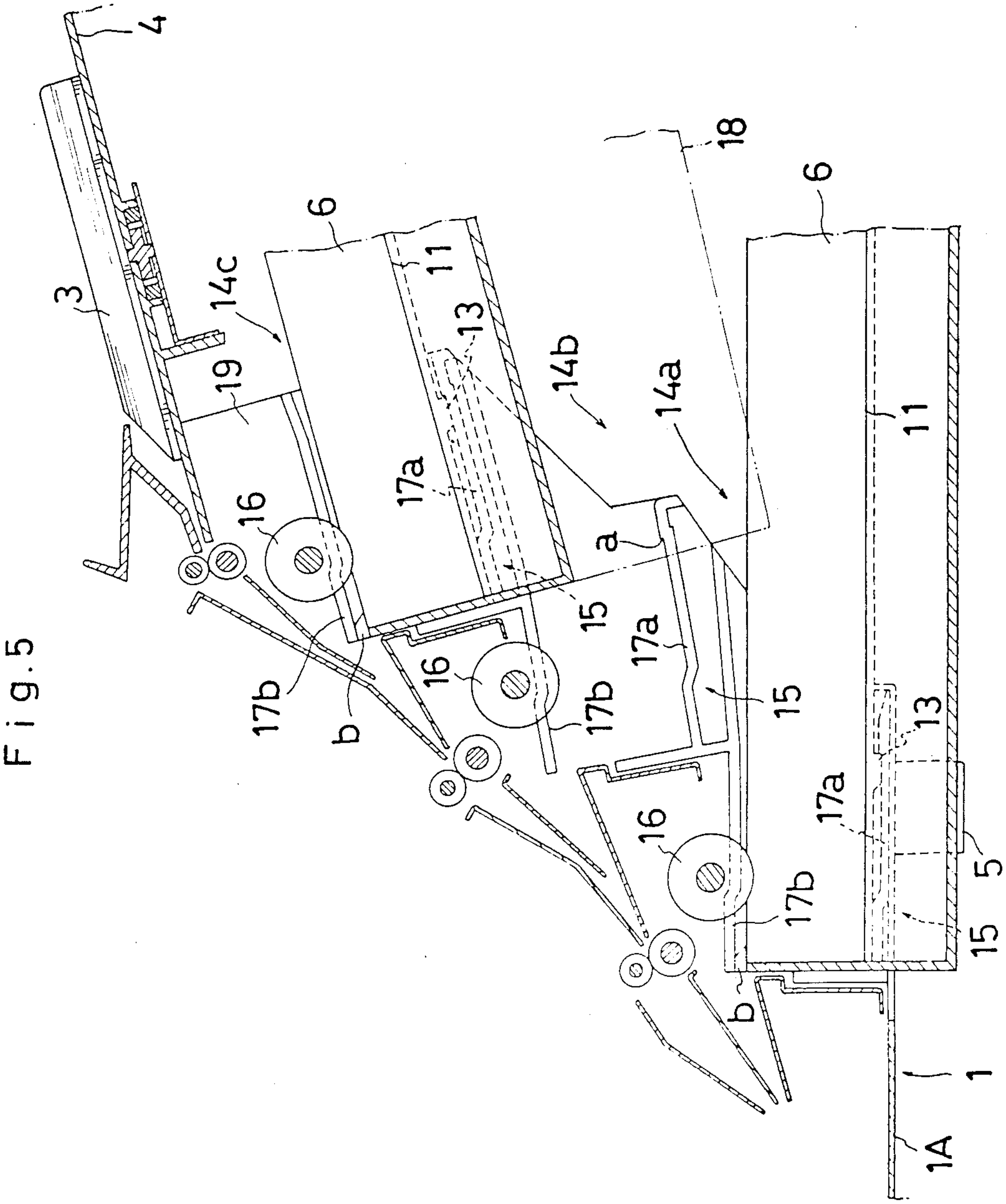
Figure 6:
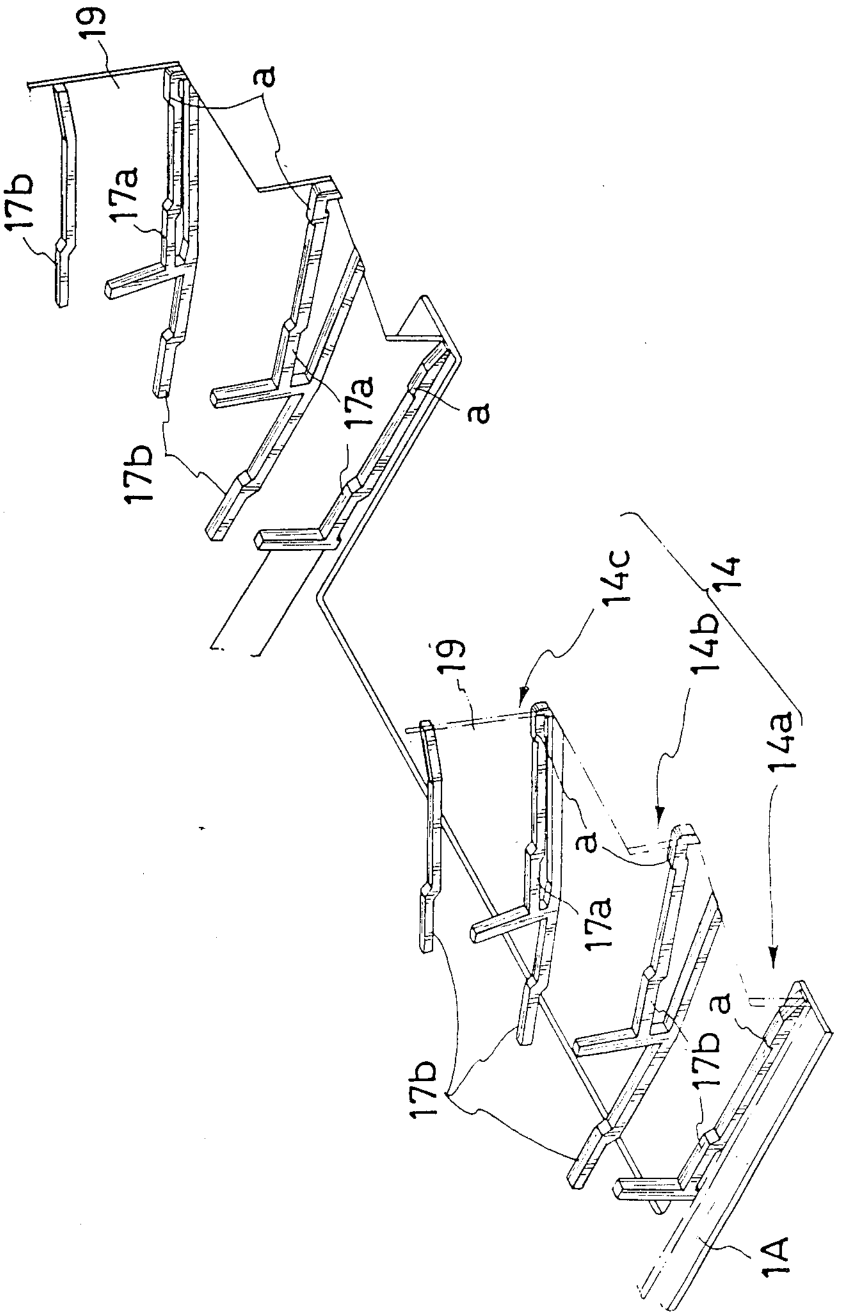
FIG. 6 is a perspective view showing details of a first cassette-guiding and holding member and a second cassette-guiding and holding member.

Referring to FIGS. 4 and 5, which are sectional views showing a space 14 within housing 1 for receiving three paper supply cassettes and cassette-holding members 15, copying paper delivery rollers 16 and cassette-holding members 15 are arranged in one space forming three smaller spaces 14*a*, 14*b*, 14*c*, each of which can receive a paper supply cassette 2 of small volume type. Spaces 14*a*, 14*b*, 14*c* are spaced vertically up and down are are staggered with each lower space extending inwardly of the housing further than the space immediately thereabove. Each smaller space has therein respective delivery roller 16 and cassette-holding member 15 which also are similarly staggered. Each smaller space can receive a respective paper supply cassette 2 of small volume type, which thus also are staggered (see FIG. 4). The first stage smaller space 14*a*, which is the lowermost one, is constructed so as to be able to house therein a paper supply cassette 6 of large volume type by providing a recess in a bottom plate 1A of housing 1 with cassette 6 extending from space 14*a* through such recess and into a space beneath housing 1 and determined by the height of leg portions 5 (see FIG. 5).

Each cassette-holding member 15 is formed integrally with a plate member 19 provided on opposite sides of the space 14. Each cassette-holding member 15 is formed of a pair of lower left and right first substantially L-shaped cassette-guiding and holding or support members 17*a* and a pair of upper left and right second cassette-guiding and holding or support members 17*b* positioned above respective of the first cassette-guiding and holding members 17*a* and spaced therefrom. A cassette-holding member 15 is constructed in such manner is positioned in each of spaces 14*a*, 14*b*, 14*c* for supporting a respective paper supply cassette 2. Each paper supply cassette is supported at both left and right sides thereof by means of first cassette-guiding and holding members 17*a* abutting guide portions 12 and by projections b abutting second cassette-guiding and holding members 17*b*. In addition, first cassette-guiding and holding members 17*a* are provided with engaging portions a for engaging with said stoppers 13.

Since, as described above, spaces 14*a*, 14*b*, 14*c* are spaced vertically and are inwardly staggered, and since paper supply cassettes 2 and 6 are constructed so as to be supported at both the left and right sides thereof only, the thus constructed paper supply system can be suitably employed for various uses. That is, such paper supply system can be used with paper supply cassettes 2 of small volume type housing 250 pieces of copying paper positioned in each of spaces 14*a*, 14*b*, 14*c*, as shown in FIG. 4. The system also can be used with a paper supply cassette 6 of large volume type positioned in the lowermost cassette-holding portion 15 in space 14*a* and with another cassette 6 in the uppermost member 15 and in both spaces 14*c* and 14*b*, as shown in FIG. 5. Also, a single paper supply cassette 18 (shown by phantom lines in FIG. 5) of super large volume type housing 1,000 or more pieces of copying paper may be positioned in the uppermost cassette-holding member 15 by utilizing first to third spaces 14*a*, 14*b*, 14*c*. Since space 14*a* is connected to the space beneath bottom plate 1A of housing 1, a paper supply cassette 6 of large volume type can be positioned in first space 14*a* and in such space formed by leg portions 5 beneath the bottom of housing 1 without increasing the total volume of the copying machine.

Figure 9:
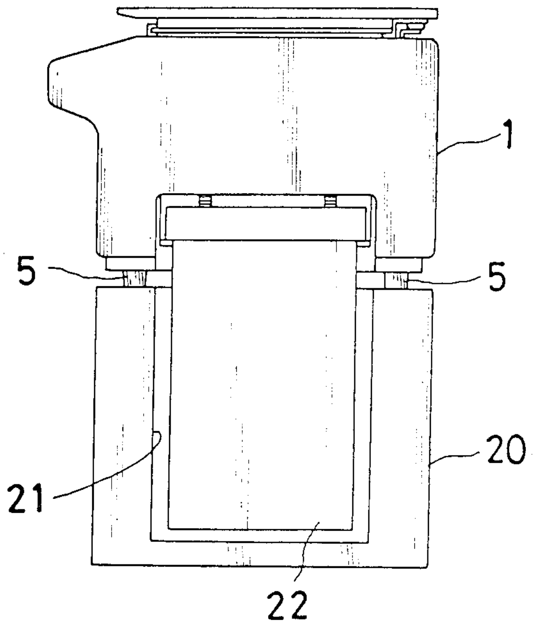
FIGS. 9 and 10 are elevation views showing a different preferred embodiment of the present invention, in which paper supply cassettes of super large volume type are employed.
Figure 10:
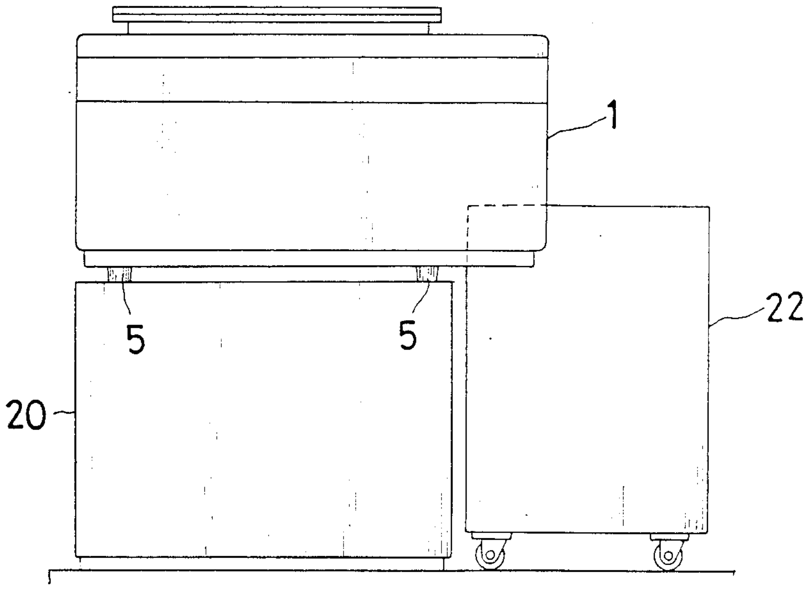

In addition, also a paper supply cassette 22 of super large volume type can be supported without increasing the total volume of the copying machine in the same manner as described above by constructing the copying machine so that leg portions 5 are located on opposite sides of the cassette and forming a recess 21 for receiving the cassette within a stand 20 for supporting the copying machine, as shown in FIG. 9, or by constructing the copying machine so that leg portions 5 do not overlap the cassette and positioning the copying machine so that leg portions 5 are located near an end of stand 20 supporting the copying machine thereon, as shown in FIG. 10.

Figure 7:
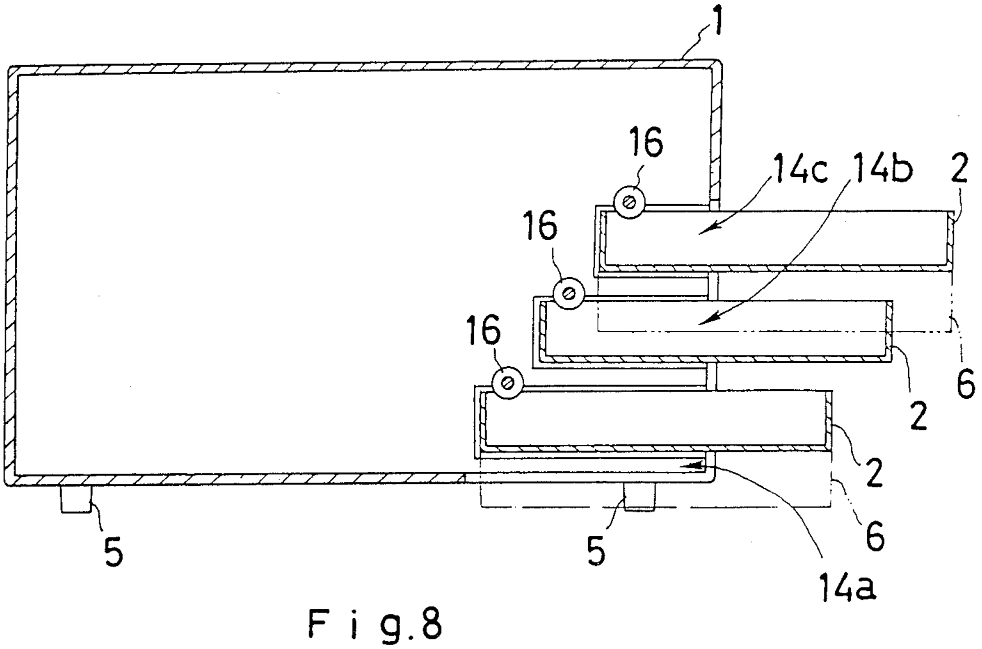
FIG. 7 is a longitudinally sectioned front view showing an outline of another preferred embodiment of the present invention.
Figure 8:
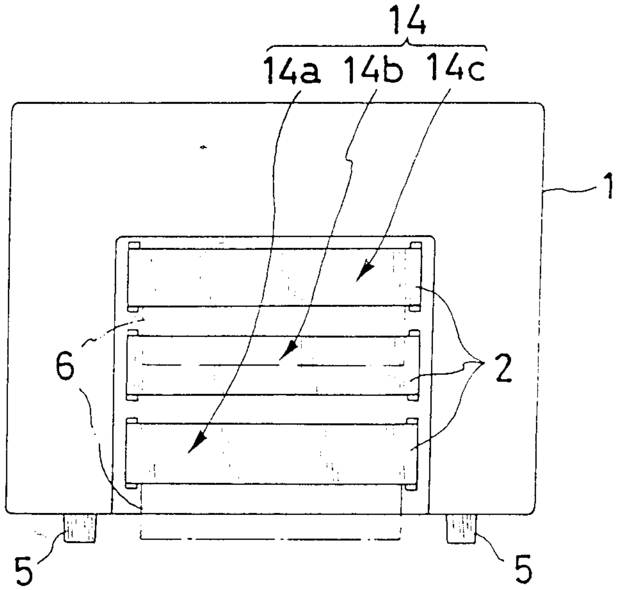
FIG. 8 is a side view showing the embodiment of the present invention of FIG. 7.

Although the bottom of the paper supply cassette 2 of small volume type or the lower surface of step portion 11 of the paper supply cassette 6 of large volume type and of the paper supply cassette 18 of super large volume type form guide portions 12 in the above described preferred embodiment of the present invention, various modifications may be made. For example, each paper supply cassette 2, 6 may be provided with guide portions 12 formed by projections extending from opposite sides thereof, and the lower surface of each such guide portion 12 may form a surface for abutting cassette-guiding and holding member thereon, as shown by phantom lines in FIGS. 2 and 3. Further, although spaces 14*a*, 14*b*, 14*c* are arranged vertically in a three-stage manner in the preferred embodiment of the present invention, only two stages may be provided, and four or more stages also may be provided. Furthermore, although the first space 14*a* is horizontally arranged and the second space 14*b* and the third space 14*c* are inclined with the inclination of the third space 14*c* being greater than that of second space 14*b*, as shown in FIG. 4, and as a result the rear end portions of cassettes 2, 6 and 18 are directed upwardly and are further spaced than at the forward ends, as shown in FIG. 1, thus providing the advantage that the cassettes can be easily inserted and extracted, the present invention is not limited to such arrangement. Thus, all of spaces 14*a*, 14*b*, 14*c* may be arranged horizontally so that all cassettes 2, 6 and 18 may be horizontally arranged, as shown in FIGS. 7 and 8.

As will be obvious from the above description, the paper supply system for a copying machine according to the present invention can be suitably and conveniently adapted to the purpose or needs of a user, since it provides a space for housing cassettes and at least two paper supply rollers as well as cassette-holding members installed in the space, the paper supply rollers and cassette-holding members being shifted or staggered so that a lower thereof is positioned more inwardly than an upper thereof, in the direction of insertion of a cassette, and each cassette is supported at both the left and the right sides thereof. For example, paper supply cassettes of small volume type can be positioned in the upper and lower spaces for housing a paper supply cassette therein, or the lower paper supply cassette of small volume type can be removed and a paper supply cassette of large volume type can be positioned in both the upper and lower spaces.

In addition, the application of the paper supply system can be remarkably increased and still more conveniently sued by applying a similar construction to a copying machine having three or more small spaces. For example, a paper supply cassette of small volume type can be positioned in each of the small spaces, a paper supply cassette of small volume type can be positioned in the lowermost space and a paper supply cassette of large volume type can be positioned in the uppermost space by removing the second stage or middle paper supply cassette of small volume type, or a paper supply cassette of super large volume type can be positioned in the uppermost space by removing the lower and middle or first and second stage paper supply cassettes of small volume type.

I claim:

1. In a copying machine paper supply system of the type wherein a plurality of cassettes each containing a supply of copying paper sheets are insertable into and removable from a space in a housing of the copying machine and including means for supporting the cassettes within said space and a plurality of paper supply rollers for withdrawing and feeding copying paper sheets from respective of the cassettes, the improvement wherein:

said supporting means comprises a plurality of separate cassette holding members for supporting respective cassettes only at opposite sides thereof without contacting portions of the cassettes between the opposite sides thereof;

each said cassette holding member comprising laterally spaced guide and support members for guiding the respective cassette during insertion into and removal from the space and for supporting opposite sides only of the cassette; and each said cassette holding member and the respective said paper supply roller, except the uppermost thereof, being positioned at a location below and staggered inwardly of the housing with respect to the next adjacent cassette holding member and respective paper supply roller.

2. The improvement claimed in claim 1, wherein each said guide and support member comprises lower and upper members for contacting lower and upper portions, respectively, of the respective cassette.

3. The improvement claimed in claim 2, wherein each said lower member has an approximately L-shaped configuration.

4. The improvement claimed in claim 2, wherein each said lower member has an abutment for contacting a stop on the respective cassette.

5. The improvement claimed in claim 2, wherein at least one said cassette has at a lower portion of each side thereof an inwardly extending step defining a downwardly facing surface contacting a respective said lower member.

6. The improvement claimed in claim 1, wherein said holding members are positioned such that the cassettes supported thereby are inclined to the horizontal, with each cassette except the lowermost cassette being inclined at a greater slope than the next lower cassette.

* * * * *